Figure 1:
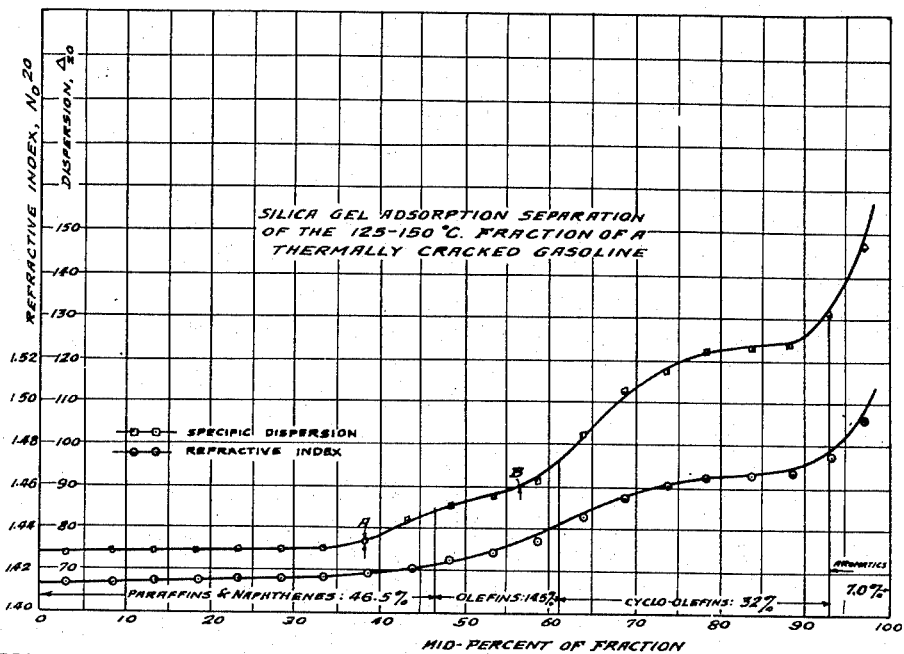

May 30, 1950

J. D. DANFORTH 2,509,486

SEPARATION OF HYDROCARBONS

Filed April 26, 1946

Inventor:
Joseph D. Danforth
By: Maynard P. Venema
Attorney

Patented May 30, 1950

2,509,486

UNITED STATES PATENT OFFICE 2,509,486

SEPARATION OF HYDROCARBONS

Joseph D. Danforth, Downers Grove, Ill., assignor to Universal Oil Products Company, Chicago, Ill., a corporation of Delaware Application April 26, 1946, Serial No. 665,290

10 Claims. (Cl. 260—666)

The present invention relates to a process for separating the components of a mixture of normally liquid hydrocarbons by an adsorption technique based upon the principle that the hydrocarbon components of such a mixture are preferentially adsorbed on silica gel in the following order of selectivity: Aromatics, olefins, naphthenes and paraffins. More specifically, the invention concerns a liquid hydrocarbon separation process involving said selective adsorption in which a particularly advantageous flow is utilized in the process to effect said separation.

In one embodiment of the present invention a hydrocarbon mixture containing liquid hydrocarbon components is separated into its constituent hydrocarbon classes by passing said hydrocarbon mixture upwardly through an adsorbent bed of silica particles until a substantial proportion of said silica particles are wet with the hydrocarbon mixture and thereafter introducing a desorbing liquid, hereinafter more fully characterized, into the bottom of said column immediately following the hydrocarbons originally charged, thereby to displace the hydrocarbons adsorbed on said silica particles in the reverse order of their preferential adsorption thereon.

One specific embodiment of the present invention concerns the selective separation of aromatic, olefinic, naphthenic and paraffinic hydrocarbons from a liquid hydrocarbon mixture containing the same by passing said hydrocarbon mixture upwardly through an adsorbent bed of silica particles, thereafter introducing into the bed of adsorbent in upward flow a desorbent liquid comprising dioxane, and collecting the desorbed hydrocarbons from the top of said adsorption bed in the following successive order of displacement: Paraffins and naphthenes, olefins and finally, aromatics.

It has been recognized for some time that a hydrocarbon mixture may be selectively separated into specific fractions, containing a predominant proportion of components belonging to the same hydrocarbon class by passing the original hydrocarbon mixture through a mass of silica particles and thereafter desorbing the hydrocarbons adsorbed by the silica with a suitable liquid desorbent. According to these observations, the mass of silica particles forming the adsorbent bed, have adsorbed thereon, in each successive strata, hydrocarbons belonging to a particular class. By displacing or desorbing the hydrocarbons adsorbed on the silica particles in each of said strata successively, in the order in which said strata occur in the bed of adsorbent, it is possible to effect thereby a separation or classification of the components of the original mixture into their respective hydrocarbon classes.

The above separation, as known and practiced by the prior art, is usually conducted by introducing the original hydrocarbon mixture to be separated into the top of a fixed bed of silica gel particles, allowing the liquid hydrocarbons to percolate downwardly through the column of silica adsorbent, thereafter introducing a selected desorbing liquid into the column, allowing the same to flow downwardly through the column to displace the adsorbed hydrocarbons and finally collecting said desorbed hydrocarbons from the bottom of the column in the order of their displacement from the adsorbent. When the respective adsorption and desorption stages of the process are operated in the above designated manner, that is, by introducing both the hydrocarbon mixture to be separated and the subsequent desorbing fluid into the top of the adsorption column and allowing them to flow downwardly, it is found that the aromatic components which are preferentially adsorbed by the silica are retained by the upper-most layer of silica particles in the adsorption column. It is also observed that in the desorption phase of the separation process the aromatic components of the charge comprise the last fraction to issue from the adsorption column. This result is believed to depend upon the selective adsorption of said aromatic hydrocarbons by silica, their preferential retention on the adsorbent silica as compared to the retention of other classes of hydrocarbons, and consequently, the displacement of said other hydrocarbon classes by the aromatics when the desorbent is introduced into the column in the desorption stage. Depending upon the same preferential order of adsorption, the olefinic components, adsorbed on the silica particles immediately below the strata of particles occupied by the aromatic components, when desorbed, displace the naphthenes adsorbed on the strata of adsorbent below that strata occupied by the olefins. Paraffinic hydrocarbons, when present in the original hydrocarbon mixture treated in the adsorption column, are least preferentially adsorbed by the silica and these components therefore accumulate in the lowest strata of silica particles in the adsorbent bed. Likewise, they are the first components to exit from the bottom of the adsorption column when the desorbent liquid enters the top of the column, since all other classes of hydrocarbons are capable of displacing said paraffins from the adsorbent. Following the paraffinic hydrocarbons, the naphthenes are next to issue from the adsorption column during the desorption stage and these are followed successively by the olefinic and aromatic components. The paraffinic and naphthenic components, both of which are of saturated structure, are adsorbed by silica with approximately the same degree of preference or selectivity, so that unless both the adsorption and desorption stages are conducted with extreme care and precision, there is relatively little separation of these hydrocarbon types. However, the slight difference in adsorptivity between the latter two classes permits a more thorough separation if the mixture is passed through successive adsorption towers in series.

Since aromatic hydrocarbons are adsorbed by the silica adsorbent in preference to any of the other classes of hydrocarbons, it follows that they will displace said other classes of hydrocarbons from the adsorbent and may be utilized as the desorbent liquid herein referred to. On the same basis, olefins will displace naphthenes and paraffins but will not displace aromatics because of the relative order of their preferential adsorption on silica.

I have found that whereas the prior art has conducted the process of silica adsorption utilizing downward flow of hydrocarbons and desorbing liquid, certain distinctive and noteworthy advantages may be realized by operating both the adsorption and desorption stages of the process on the basis of an upward flow of the hydrocarbon charging stock and of the desorbent liquid through the fixed bed of adsorbent. The separation of hydrocarbons utilizing upward flow of both the hydrocarbon mixture and of the desorbent liquid the.efore comprises the principal object of my invention.

It has been noted in the use of the prior art technique involving downward flow of the hydrocarbon charging stock and of the desorbent liquid following the adsorption stage, that co-diffusion of the various hydrocarbon strata contained in the silica adsorption column occurs in the desorption stage of the process, resulting in imperfect or incomplete separation of the hydrocarbon components. The latter effect occurs as the result of the adverse trend in specific gravities of the hydrocarbons occupying the various strata within the adsorption column. Since the aromatic hydrocarbons contained in the mixture to be separated have the greatest preferential adsorptivity on the silica particles, these components are adsorbed on the first portions of the bed of silica adsorbent with which the hydrocarbon charge comes in contact when said charge is introduced into the top of the column. For similar reasons, the olefins, naphthenes and paraffins occupy successively lower strata within the adsorption column because the selectivity of adsorption for each of the above classes of hydrocarbons decreases in the same order. The adverse effect of the specific gravities of each of the above hydrocarbon classes arises however, during the desorption stage of the process by virtue of the fact that the aromatic hydrocarbons, adsorbed in the uppermost strata of silica adsorbent, also have the greatest specific gravities, the olefins adsorbed on the strata of silica particle immediately below the strata occupied by the aromatics have somewhat lower specific gravities and the paraffins and the naphthenes occupying the lowest strata of adsorbent have the lowest specific gravities. In the desorption stage of the process utilizing the prior art flow method, the aromatic hydrocarbons are displaced first and because they have the highest specific gravities, they tend to migrate downwardly in advance of the desorbent by gravity diffusion into the lower strata of silica particles occupied by the olefins. The aromatic hydrocarbons thereby tend to mix with the olefins which they displace from the silica adsorbent by virtue of their preferential adsorption on the said adsorbent. Thus, the purpose of the separation tends to be defeated by the co-diffusion of the adsorbed hydrocarbons, resulting in less precise fractionation, of the hydrocarbon charge.

When employing an upward flow of the hydrocarbon charge to be separated and of the subsequent desorbent liquid, on the other hand, according to the method herein described, the aromatic hydrocarbons occupy the lowest strata of silica gel, the olefins occupy a higher strata and the saturated paraffins and naphthenes are adsorbed in the upper-most layer of the adsorbent. The relative order of adsorption within the column therefore corresponds and is consistent with the relative specific gravities of the hydrocarbon components and when the desorbent liquid is subsequently introduced into the silica column and forced to flow from the bottom to the top thereof, the hydrocarbons contained in each of the respective strata are desorbed from the silica and flow out of the top of the column in a regular increasing order of specific gravity. The improved process of the present invention thereby eliminates the undesirable gravity diffusion which is characteristic of the downward flow process and permits greater precision and selectivity of separation.

A further merit inherent to the present method of operation is the fact that excellent separation of hydrocarbon mixtures may be effected without giving special consideration to the use of certain grades of uniformly sized particles of silica adsorbent, which for practical purposes is necessary when employing the downward flow method. In said downward flow method, for example, when utilizing an adsorption column containing variously sized particles of adsorbent, the hydrocarbons charged into the column tend to channel into paths of least resistance where the particles of adsorbent, because of their variation in size, are not arranged in any definite pattern with uniform spacing between them. The liquid hydrocarbons therefore tend to at least partially by-pass those particles of silica situated in areas of greater resistance to flow, thereby rendering said areas ineffective for their intended purpose. In the present method of charging the liquid hydrocarbons upwardly through the adsorbent bed, however, the charge fills all the spaces between the silica particles as it enters the bottom of the column and as the flow continues upwardly. It is therefore immaterial, in so far as channeling of the charge is concerned, whether uniformly sized silica particles are utilized or not. The capacity of a given column of particles is consequently increased and effective utilization of the adsorbent is thus provided. Since the total area of all the silica particles contained within the adsorption column is the significant factor determining the efficiency of the subsequent separation (the adsorption taking place essentially on the surface of each particle) it is preferred to employ herein the smallest size of silica particle consistent with the desired rate of flow. I prefer, for most efficient operation, to utilize silica particles ranging in size from about 300 to about 10 mesh (where mesh is defined as the number of spaces in a screen one square inch in size and having a standard size wire corresponding to the specifications for a designated mesh size).

Although, as previously noted, the size of the adsorbent particle is not critical for efficient separation, beyond the size required to allow passage of the liquid hydrocarbon charging stock through the column, the size does affect the requirements for the particular apparatus utilized in the adsorption column. The height and cross-sectional area of the adsorption column required for a given throughput of hydrocarbon charge depends not only upon the precision of separation desired but also upon the size of the adsorbent particles of silica utilized in the adsorption column. As a general rule the precision of separation depends upon the height of the adsorption column, or more specifically, it depends upon the quantity of fresh adsorbent available to a given charge and the rate of throughput. I have found that the preferred ratio of diameter or width of the adsorption column to the height thereof is within the range of from about 0.1 to about 0.01 and preferably at about 0.05 to about 0.01. The rate of throughput or charging rate into the adsorption column may be as high as 20 to 50 volumes of hydrocarbon mixture per unit volume of adsorbent per hour for finely divided silica particles of from about 50 to 200 mesh to slower charging rates for the larger size particles of silica, although, again it must be emphasized that higher rates of throughput may be employed with coarser particles of silica if the height of the adsorption column is increased or a reduction in the precision of separation can be tolerated.

An additional factor which determines the size of the adsorption column to be utilized and the size of the silica particles employed as adsorbent is the concentration of particular hydrocarbon components in the hydrocarbon charge to be separated. In a hydrocarbon mixture containing a high proportion of aromatic components, the height of the adsorption column is desirably increased and the cross-sectional area of the column reduced to permit cooling of the hydrocarbon charge as the adsorption proceeds. The necessity for cooling the contents of the column during adsorption is important in that charging stocks containing high portions of aromatic components, say above about 80%, cause considerable evolution of heat during the adsorption stage, necessitating refrigeration of the column or, alternatively, a decreased charging rate to allow for the dissipation of the heat caused by the adsorption process. It is also observed that convection of the hydrocarbon components absorbed on the silica particles occurs during the adsorption if the temperature of the column is not maintained relatively uniform and this factor may result in a reduction in the precision of separation. For the above reasons it is preferred, when separating a mixture containing a high proportion of aromatic components, to refrigerate the adsorption column and/or to dilute the hydrocarbon charging stock with a quantity of a suitable paraffinic hydrocarbon, such as pentane or hexane.

The refrigeration or cooling of the adsorbent bed of silica may be accomplished by circulating the refrigerant around the outside walls of the columns, or what is considered to be preferable, the circulation of the refrigerant through vertical or horizontal hollow tubes fixed within the adsorption column somewhat analogously to the tubes of a heat exchanger. The column is desirably maintained below about 50° C. and preferably even lower, in the range of from about 20° to about 0° C. It is thus particularly suitable to circulate ice water as refrigerant in the column.

For charging stocks containing low boiling components, as for example butenes and/or butadiene, the refrigerant may be maintained at even lower temperatures than the above specified range or the column may be operated under super-atmospheric pressures to maintain the hydrocarbons in liquid phase. The use of super-atmospheric pressures may be desired for other purposes, as for example, to force the charging stock through the column at a higher rate than would be obtainable at normal pressures. It is, of course, necessary under the present method of operation, in order to obtain upward flow of the hydrocarbon charging stock, to maintain the pressure on the liquid hydrocarbon charge at a higher value than the pressure at the top of the adsorption column, and the latter value depends upon the resistance to flow of the charge through the bed of adsorbent, which in turn depends upon the size of the adsorbent particles.

The desorbing liquid utilized herein for displacing the adsorbed hydrocarbon components from the silica particles must necessarily have a specific gravity greater than the specific gravity of the aromatic components of the hydrocarbon charging stock (that is above about 0.95) so that the desorbent liquid at all times remains below the hydrocarbon layer as it "pushes" the hydrocarbon charging stock from the bottom to the top of the adsorption column. The second requisite property necessarily possessed by the desorbent is that it must wet the silica adsorbent preferentially as compared to the wetting capacity of the most adsorbent hydrocarbon contained in the charging stock, that is the aromatic components in mixtures containing the same. Among the liquids possessing the above properties, I have found that dioxane and pyridine are typical representatives of such liquids which cause a very satisfactory displacement of the hydrocarbons and permit the accurate separation of hydrocarbon mixtures, although I do not wish to be specifically limited to these desorbents. Other liquids undoubtedly possess the above properties which would render the same suitable as desorbents herein and their suitability may be readily established by trial. Other liquids which I have found to be utilizable, although with somewhat less desirable efficiency because of the tendency of the hydrocarbons to entrain in said desorbent, comprise certain alkylene glycols, typical of which is ethylene glycol. Water may be utilized if the desorption stage is operated at a low rate of throughput and especially when temperatures above about room temperature are maintained in the adsorption column during desorption. When it is desired to separate aromatic hydrocarbons from admixture, for example, with paraffins, an aromatic hydrocarbon may be utilized as the desorbent to displace the paraffins; the aromatics are subsequently recovered utilizing a desorbent such as dioxane which displaces said aromatics because of the preferential adsorption of said desorbent on the adsorbent. The same type of operation may be employed for the displacement of paraffins by olefins after passing an olefin-paraffin mixture through the adsorption column. In the desorption stage, the demarcation between the successive fractions pushed upward through the adsorption column by the desorbent is generally made by refractive index, specific gravity and/or specific dispersion determinations on the desorbed effluent from the adsorption column to mark the end of a particular class of hydrocarbons issuing from the adsorption column. As the adsorption proceeds, specific fractions of predetermined size, depending upon the size of the adsorption column, may be removed from the effluent stream and the above physical tests determined on the same to fix the end point of a particular class of hydrocarbons desorbed from the silica. In general however, a single test, such as the specific dispersion, is sufficient to indicate the end point of the particular fraction.

Following the desorption stage of the present process, the silica particles may be reactivated for subsequent adsorption by passage of an inert gas, such as steam, nitrogen, carbon dioxide, etc., through the silica column and heating the silica to an elevated temperature of from about 150° to about 250° C. In some cases the inert gas may be dispensed with and the column merely heated at the indicated temperature, especially when the desorbent liquid is highly volatile or where a hydrocarbon desorbent of preferential adsorptivity is utilized as the desorbent liquid.

When a large capacity operation and/or a continuous process is desired, it is generally necessary to maintain several adsorption columns in parallel operation to allow at least one column of the series to be operated as an adsorption column, while the remaining columns are being reactivated. It is also within the scope of the present invention to fractionate the hydrocarbons by silica adsorption utilizing several columns in series or parallel flow in one of which a rough or approximate separation is effected and where the other columns are operated to effect more precise fractionation of the desorbed hydrocarbons from the proceeding column or columns. Further, it is within the scope of this invention to operate the process with the abjective of merely reducing the concentration of a given class of hydrocarbons in a particular charging stock as, for example, an operation in which the olefinic and/or aromatic component of a mixture of hydrocarbons containing the same are removed therefrom. In this type of operation, the charge may be passed into the adsorption column at a higher rate of throughput and the effluent from the first column may be charged into a series of succeeding columns to remove additional quantities of the above components.

The present process is also applicable to the separation of more highly unsaturated hydrocarbons from less highly unsaturated components of a mixture, since the components possessing more unsaturated bonds are preferentially adsorbed to those having a lesser degree of unsaturation. Thus, it is possible to separate butadiene from butane and/or butene or to separate styrene from ethylbenzene, utilizing the principles herein set forth.

The following examples are introduced for the purpose of illustrating the present process, the type of charging stocks or hydrocarbon mixtures which may be treated herein, the types of desorbents which may be utilized to displace the hydrocarbons previously adsorbed, and to indicate the various physical factors involved, such as temperatures, flow rates and adsorbent to hydrocarbon charge ratios; said examples are not intended, however, to limit or define the scope of the invention in any manner or to prescribe the limits of said factors.

EXAMPLE I

A thermally cracked gasoline (from a West Texas crude) containing aromatics, olefins, naphthenes and paraffins in unknown proportions and having the distillation characteristics and physical properties indicated in the following Table I was fractionated to separate a fraction boiling within the range: 125°–150° C.

TABLE I

*A. S. T. M. distillation and physical properties of a thermally cracked gasoline*

| Boiling Range, °C. | Volume Per Cent of Gasoline | $N_D^{20}$ | $\Delta_{20}$ | Bromine Number |
|---|---|---|---|---|
| Initial—15 | 11.0 | | | |
| 15–40 | 8.2 | 1.37317 | 76.0 | 122 |
| 40–70 | 10.4 | 1.38970 | 80.0 | 105 |
| 70–100 | 12.9 | 1.41226 | 85.8 | 92 |
| 100–125 | 11.9 | 1.42096 | 87.4 | 82 |
| 125–150 | 13.7 | 1.43640 | 95.9 | 67 |
| 150–175 | 12.1 | 1.44255 | 96.6 | 49 |
| 175–200 | 14.5 | 1.44906 | 98.7 | 44 |
| Bottoms | 5.3 | | | |

The above fraction was subjected to silica adsorption by introducing the same into the bottom of a cylindrical glass tube 160 cm. high having a cross sectional area of 13.2 sq. cm. and packed with silica gel particles of from 14 to 20 mesh size obtained from the Harshaw Chemical Company. A pressure of from about 2 to about 15 pounds per square inch gage was applied to the hydrocarbon surface to push the gasoline fraction upward through the column of adsorbent at a rate of 350 cc. of charging stock per hour. When the charge had completely covered the silica gel, dioxane was introduced into the column, immediately behind the hydrocarbon charge to displace the adsorbed hydrocarbons and force the latter from the top of the column into a receiver. The column effluent was collected in approximately 2 cc. fractions and refractive index and specific dispersion determinations made on each of said fractions. The following table, Table II, represents the data obtained and Figure 1 represents the data plotted graphically.

Figure 2:
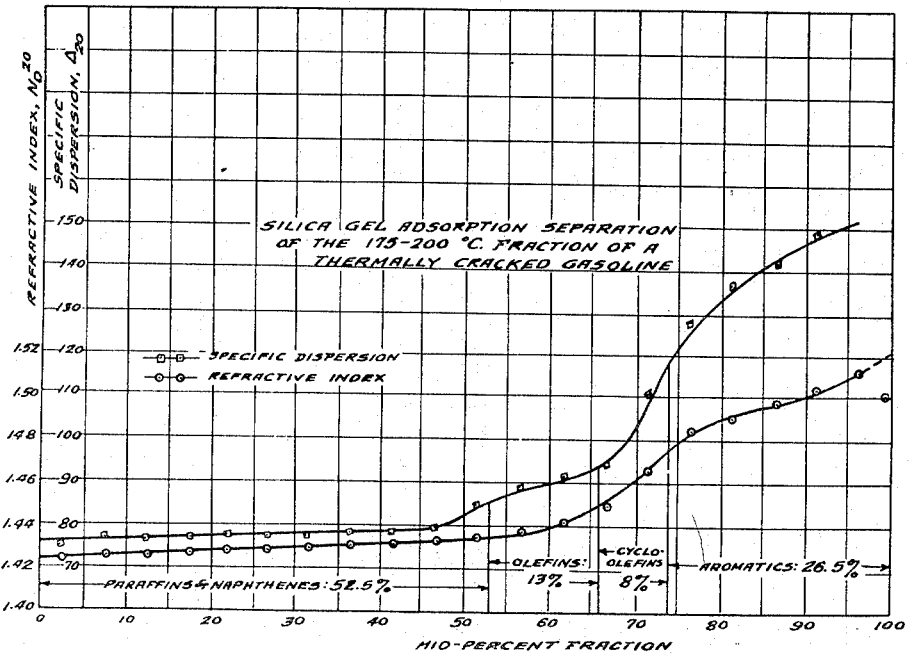

Referring to Figure 1, the composition of the hydrocarbon mixture separated (in the example, the 125–150° C. fraction of a thermally cracked gasoline) was determined from the graph of $\Delta_{20}$ vs. mid-percent of fraction by the following procedure:

(1) *Paraffin and naphthene content.*—A mark was placed at the point at which the value of the dispersion began to increase rapidly (point A, on Figure 1). Another mark was placed at the average value of the dispersion for the olefins in the boiling range of the fraction (average value: 89.4 or point B on Figure 2). This average value was taken from data in the following reference: Industrial Engineering Chemistry, (analytical edition), 10, 570 (1938). A vertical line parallel to the $\Delta_{20}$ axis gave the percentage of naphthenes plus paraffins (at 46.5 mid-percent of fraction).

(2) *Olefin content.*—This value was taken as the percent difference between the vertical line drawn for the paraffin-naphthene line of demarcation and a vertical line drawn at a refractive index intermediate to the average value for the olefins and the average value for the cyclo-olefins. These average values were taken from the proceding reference given in (1) above.

(3) *Aromatic content.*—This value was determined from the position of the vertical line drawn at a refractive index intermediate to the average values for the cyclo-olefins and aromatics taken from the reference given in (1) above.

The composition of the 125–150° C. fraction employed in Example I is:

| Class of Hydrocarbons | Composition Per Cent of Total |
|---|---|
| Paraffins-naphthenes | 46.5 |
| Olefins | 14.5 |
| Cyclo-olefins | 32.0 |
| Aromatics | 7.0 |

TABLE I

*Silica adsorption separation of a 125–150° C. fraction of a thermally cracked gasoline*

| Mid-percent of fraction [1] | $N_D^{20}$ | $A_{20}$ |
|---|---|---|
| 2.8 | 1.41326 | 74.0 |
| 8.3 | 1.41416 | 74.0 |
| 13.4 | 1.41426 | 74.0 |
| 18.3 | 1.41466 | 74.0 |
| 23.4 | 1.41506 | 74.8 |
| 28.5 | 1.41586 | 74.9 |
| 33.5 | 1.41676 | 74.9 |
| 38.5 | 1.41786 | 76.3 |
| 43.4 | 1.42136 | 82.4 |
| 48.3 | 1.42516 | 85.7 |
| 53.2 | 1.42837 | 88.0 |
| 58.5 | 1.43350 | 91.2 |
| 64.0 | 1.44526 | 102.5 |
| 68.8 | 1.45547 | 112.4 |
| 73.6 | 1.46075 | 117.5 |
| 78.5 | 1.46424 | 122.1 |
| 83.5 | 1.46632 | 122.8 |
| 88.4 | 1.46790 | 124.0 |
| 93.1 | 1.47577 | 131.0 |
| 97.1 | 1.49327 | 147.6 |
| 99.5 | 1.48676 | |

[1] NOTE: Mid-percent of fraction indicates the accumulative percentage of the entire mixture treated inclusive to the mid-point of the particular fraction.

EXAMPLE II

The 175–200° C. fraction of the original thermally cracked gasoline, the properties of which are given in Example I, was subjected to silica adsorption separation in a column containing silica gel particles of the same specification as that employed in Example I, the silica absorbent being regenerated by heating the column to 200° C. and flushing nitrogen through the bed of adsorbent. Following the regeneration, the column was allowed to cool and the above charge stock, (the 175–200° C. fraction of the thermally cracked gasoline), was forced into the column at a rate of 300 cc. of charge per hour. Dioxane was thereafter forced into the bottom of the column to displace the hydrocarbons adsorbed on the silica. Approximately 2 cc. fractions were collected and the data determined on each of said fractions is given in the following table, Table III, and plotted graphically in Figure 2. The composition of the mixture determined by the method given above in Example I is:

| Class of Hydrocarbons | Composition % of Total |
|---|---|
| Parafins and naphthenes | 52.5 |
| Olefins | 13.0 |
| Cyclo-olefins | 8.0 |
| Aromatics | 26.5 |

TABLE III

*Silica adsorption separation of a 175–200° C. fraction of a thermally cracked gasoline*

| Mid Per Cent of Fraction | $N_D^{20}$ | $A_{20}$ |
|---|---|---|
| 2.3 | 1.42256 | 75.0 |
| 7.3 | 1.42446 | 76.8 |
| 12.3 | 1.42586 | 76.8 |
| 17.3 | 1.42767 | 76.8 |
| 22.0 | 1.42847 | 77.0 |
| 26.5 | 1.42887 | 77.0 |
| 31.4 | 1.42927 | 77.0 |
| 36.3 | 1.43008 | 78.0 |
| 41.3 | 1.43209 | 78.0 |
| 46.3 | 1.43360 | 79.0 |
| 51.2 | 1.43400 | 85.2 |
| 56.3 | 1.43761 | 89.0 |
| 61.5 | 1.44265 | 91.2 |
| 66.6 | 1.44846 | 94.6 |
| 71.5 | 1.46632 | 111.1 |
| 76.4 | 1.48396 | 128.0 |
| 81.4 | 1.49165 | 136.1 |
| 86.4 | 1.49763 | 141.5 |
| 91.2 | 1.50437 | 148.5 |
| 96.3 | 1.51464 | |
| 99.5 | 1.50055 | |

I claim as my invention:

1. A process for the separation of a hydrocarbon mixture into its component hydrocarbon classes which comprises passing said mixture upwardly through a stationary bed of adsorbent silica particles until at least a substantial proportion of said particles are contacted with said mixture and thereafter passing into said adsorbent bed following said hydrocarbon mixture, a desorbing liquid to displace said hydrocarbons in the order of their preferential displacement from said absorbent.

2. A process for the separation of a mixture of hydrocarbon components containing at least 2 of the following classes of hydrocarbons: Aromatics, olefins, naphthenes and paraffins which comprises passing said mixture upwardly through a stationary bed of adsorbent silica particles and thereafter displacing said hydrocarbons in the order of their preferential displacement from said adsorbent by passing a desorbing liquid in upward flow following said hydrocarbon mixture.

3. A process for the separation of aromatic hydrocarbons from a mixture of the same with olefins which comprises passing said mixture upwardly through a stationary bed of adsorbent silica particles, thereafter displacing said hydrocarbons with a desorbent liquid introduced into the bottom of said adsorbent bed following the hydrocarbon mixture and collecting first the olefins contained in said mixture followed by the aromatics therein.

4. A process for the separation of olefinic hydrocarbons from a mixture of the same with paraffins which comprises passing said mixture upwardly through a stationary bed of adsorbent silica particles, thereafter displacing said hydrocarbons with a desorbent liquid and collecting first the paraffins contained in said mixture followed by the olefins.

5. A process for the separation of aromatic hydrocarbons from a hydrocarbon mixture containing the same and other hydrocarbon classes of compounds which comprises passing said mixture upwardly through a stationary bed of adsorbent silica particles and thereafter displacing said other hydrocarbons with an aromatic hydrocarbon desorbent following said mixture in the adsorbent bed of silica particles.

6. The process of claim 2 further characterized in that said desorbent liquid is dioxane.

7. A process for the separation of a hydrocarbon mixture containing at least two hydrocarbons of different degrees of saturation, which comprises passing the mixture upwardly through a stationary bed of adsorbent silica, adsorbing the less saturated hydrocarbon in a lower stratum of the bed and the more saturated hydrocarbon in an upper stratum of the bed, and thereafter displacing the more saturated hydrocarbon and the less saturated hydrocarbon from the bed in the last-mentioned order by passing a desorbing liquid upwardly through the bed.

8. A process for the separation of a hydrocarbon mixture containing saturated, aromatic and olefinic hydrocarbons, which comprises passing the mixture upwardly through a stationary bed of adsorbent silica, adsorbing the aromatic hydrocarbon in a lower stratum of the bed, the olefinic hydrocarbon in an intermediate stratum and the saturated hydrocarbon in an upper stratum, and thereafter displacing the saturated, olefinic and aromatic hydrocarbons from the bed in the last-mentioned order by passing a desorbing liquid upwardly through the bed.

9. A process for the separation of a hydrocarbon mixture containing an aromatic hydrocarbon and an aliphatic hydrocarbon, which comprises passing the mixture upwardly through a stationary bed of adsorbent silica, adsorbing the aromatic hydrocarbon in a lower stratum of the bed and the aliphatic hydrocarbon in an upper stratum of the bed, and thereafter passing a desorbing liquid upwardly through the bed to displace the aliphatic hydrocarbon and the aromatic hydrocarbon in the last-mentioned order.

10. A process for the separation of a hydrocarbon mixture containing an olefinic hydrocarbon and a paraffinic hydrocarbon, which comprises passing the mixture upwardly through a stationary bed of adsorbent silica, adsorbing the olefinic hydrocarbon in a lower stratum of the bed and the paraffinic hydrocarbon in an upper stratum of the bed, and thereafter passing a desorbing liquid upwardly through the bed to displace the paraffinic hydrocarbon and the olefinic hydrocarbon in the last-mentioned order.

JOSEPH D. DANFORTH.

REFERENCES CITED

The following references are of record in the file of this patent:

UNITED STATES PATENTS

| Number | Name | Date |
|---|---|---|
| 2,395,491 | Mavity | Feb. 26, 1946 |
| 2,398,101 | Lipkin | Apr. 9, 1946 |
| 2,415,315 | Walter et al. | Feb. 4, 1947 |

OTHER REFERENCES

Mair et al., Oil and Gas Journal, Sept. 19, 1935, pages 29, 30 & 32.